United States Patent [19]

Covarrubias et al.

[11] Patent Number: 4,706,973
[45] Date of Patent: Nov. 17, 1987

[54] CHUCK AND TOP JAW ASSEMBLIES

[75] Inventors: David S. Covarrubias, 3561 Calle Quebracho, Thousand Oaks, Calif. 91360; Reza M. Yassan, 555 Rosewood Ave., Camerillo, Calif. 93010; Maria S. Covarrubias, 3561 Calle Quebracho, Thousand Oaks, Calif. 91360; Arturo Revuelta, 649 W. Hammel St., Monterey Park, Calif. 91754

[73] Assignees: David S. Covarrubias, Thousand Oaks; Reza M. Yassan, Woodland Hills; Maria S. Covarrubias, Thousand Oaks; Arturo Revuelta, Monterey Park; Jose Revuelta, Los Angeles, all of Calif.

[21] Appl. No.: 894,681

[22] Filed: Aug. 8, 1986

[51] Int. Cl.⁴ .............................................. B25B 5/16
[52] U.S. Cl. .................................. 279/1 SJ; 269/266; 269/275; 279/123
[58] Field of Search ...................... 279/1 SJ, 123, 110; 269/266, 270, 275; 82/DIG. 6

[56] References Cited

U.S. PATENT DOCUMENTS

| 2,757,008 | 7/1956 | Lane | 279/110 |
| 2,950,117 | 8/1960 | Walmsley | 279/123 |
| 3,179,430 | 4/1965 | Zierden | 279/123 |
| 3,190,666 | 6/1965 | Testa | 279/123 |
| 3,244,430 | 4/1966 | Buck | 279/123 X |
| 3,322,434 | 5/1967 | Mc Clung et al. | 279/123 |
| 3,679,221 | 7/1972 | Behrens | 279/123 X |

Primary Examiner—Gil Weidenfeld
Assistant Examiner—Steven C. Bishop
Attorney, Agent, or Firm—Frank L. Zugelter

[57] ABSTRACT

Top jaw assemblies combined with a chuck. Each of these top jaw assemblies comprises a body having a base projecting radially inwardly when mounted to the chuck, a cylindrical wall in the body which with the base provides a cutout portion and in which a workable rotatable workpiece gripping member or "slug" is mounted and secured to the base. The slug's periphery or annular wall conforms to and engages the cylindrical wall and includes an opening having a counterbored hole in which a screw mounts and extends below the slug to thread to a threaded aperture in the base. The slugs are machinable to provide different gripping surfaces contoured to the configuration of different workpieces, and are rotatable to provide the necessary reset position for such gripping surfaces in relation to the different sized workpieces. The base can be slightly inclined so as to force the slug's diameter against the matching radius of the cylindrical wall when the slug is torqued to the base. The jaw body can be relieved to reduce an assembly's weight, thereby reducing centrifugal force and increasing the gripping force about a workpiece. Other specially configured slugs provide for gripping square workpieces.

19 Claims, 18 Drawing Figures

CHUCK AND TOP JAW ASSEMBLIES

TECHNICAL FIELD

This invention relates to top jaw assemblies mounted to a chuck face, and in particular, is directed to novel and improved jaw assemblies.

PRIOR ART

See U.S. Pat. Nos.: 3,459,433; 3,679,221; 3,707,293; 4,488,731; 4,496,165; 4,550,922; and 4,566,228.

BACKGROUND

A plurality of top jaws radially equi-distant from one another and mounted on the face of a chuck for securing a workpiece in position for turning or cutting action thereon is well known in the art. The important and essential factor in almost all machining applications is the secure holding or gripping of the workpiece on which machining operations are to be performed. Top jaws themselves have been machined to grip the workpiece, but then discarded when that sized and configured workpiece has been machine-finished. U.S. Pat. No. 3,679,221, teaches the use of an insert, however, it is limited in its construction and use. The present state-of-the-art teachings do not disclose a rotatable, reshapeable insert or "slug" combined with a top jaw to achieve one or more of the objects described hereinafter.

One of the most commonly used tools for holding a part or workpiece is a turning chuck. This tool uses two or more manually-mounted top jaws on master jaws which make the holding or gripping of the workpiece possible.

ADVANTAGES

This invention surpasses the limitations included in top jaws used in today's tools, by mounting a rotatable, reshapeable slug on the body of each individual top jaw. By rotating the slug, to a reset position, the top jaw gains the advantage of a multi-machining capability, i.e., the top jaw is reuseable many times with the same slug that has been worked and re-worked to produce a different gripping surface for a different sized workpiece. The top jaw turns into a special tool which adds several useful characteristics to today's machining procedures. In addition to the top jaw of this invention mounting on the face of a chuck like other known jaws, the need to repurchase common jaws and the attendant cost therewith is eliminated. Also, the discarding of common jaws that otherwise occurs after a mere several operations is overcome. In this invention, the rotatable slug is the element of the top jaw assembly which is machined-repeatable to provide the many times of use for the top jaw assembly. It only is the using up or the wear of the material of the slug that prevents its repeatability of use. On the other hand, the slug can be replaced quickly and inexpensively without the requirement that an entire top jaw assembly be purchased.

SUMMARY OF THE INVENTION

The present invention comprises a plurality of top jaw assemblies disposed equi-distant about and radially mounted on the face of a chuck. Each of such top jaw assemblies includes means for mounting it to a corresponding master jaw, an example being rows of serrations separated by a channel on its inner face and which cooperate with corresponding serrations mounted on the master jaw. A spaced pair of counterbored-and-relief holes extend in vertical orientation through the body of each jaw so that an Allen screw member is adapted thereto for securing the jaw to a projection on a T-member cooperatively related to a master jaw assembly included in the chuck. The body of the top jaw is defined by a thickness that is complete between its inner face and outer face. Each top jaw includes a cylindrical or circular wall extending downwardly from its outer face to a base member, a cutout portion formed above the base member and in which a rotatable, reshapeable gripping member or "slug" seats and is securely mounted to such base. The length of the slug is longer than the depth of the cutout portion and its diametrical dimension provides for projection beyond the base member, particularly in a direction towards the axis of the chuck. The saleable or non-reshaped slug is worked or machined to a contour, i.e., reshaped, to correspond to the configuration of the workpiece which mounts to the slug as the slug's configured contour grips it.

The slugs are made from metal, such as steel or aluminum, and from some types of plastic, such as DELRIN. The plastic is useful in holding fragile and delicate workpieces, while the steel slug can be hardened to resist wear.

An object of this invention is to provide a top jaw assembly which provides for multi-machining capability, i.e., its slug initially machined to form a gripping surface, after which the top jaw assembly is reuseable many times by rotating the slug into a re-set position, the slug then being machined or re-worked to produce a different shape for its gripping surfaces for a differently-configured workpiece.

Another object of the invention is to eliminate the need for purchasing another set of common jaws and their relative high cost of replacement.

A further object of the invention is to eliminate loss of use of common jaws after a mere several times of machining the common jaws to accomodate their gripping surfaces, by reason of remachining the rotatable, reshapeable slugs over again.

Another object of the invention is the retention of the top jaw body proper itself, although the slugs after their effective usefulness may be discarded.

A still further object of the invention is the saving of set-up time by means of replacing slugs either pre-machined or of different material to accomodate the workpiece without dismounting the entire jaw from a chuck face.

Another object of the invention is to reduce the weight of the top jaws when steel jaws are required for gripping the workpiece, thereby reducing centrifugal forces while increasing the force of the grip on the workpiece, and also thereby eliminating interference between a turning chuck and stationary parts of its lathe.

A further object of the invention is to utilize the hydraulic power of the lathe for clamping the work piece, in contrast to using that power to reduce the unwanted centrifugal force.

A further object of the invention is to provide an option in the utilization of rotatable, reshapable slugs made of different materials, thereby providing advantages that would be obtained only with a multitude of sets of conventional jaws made out of different materials, examples being steel and aluminum.

A further object of this invention is to provide an inexpensive and quick fabrication (reworked or reshaped) of the slugs or special kinds therof, within the machine shop itself, without seeking inserts from an outside source.

A still further object of the invention is the transferability of a machined (reshaped) slug from one chuck to another jaw, where the sizes of the slugs in both jaws are the same, and thereby provide moveable set-ups from one chuck to another, without necessity of machining another top jaw or jaws for the following operation.

These and other objects and advantages of the invention will become more apparent by a full and complete reading of the following description, the accompanying drawing, and the appended claims.

BEST MODE FOR CARRYING OUT THE INVENTION

Figures 1, 2, 3, 4, 5, 6, 7, 8:
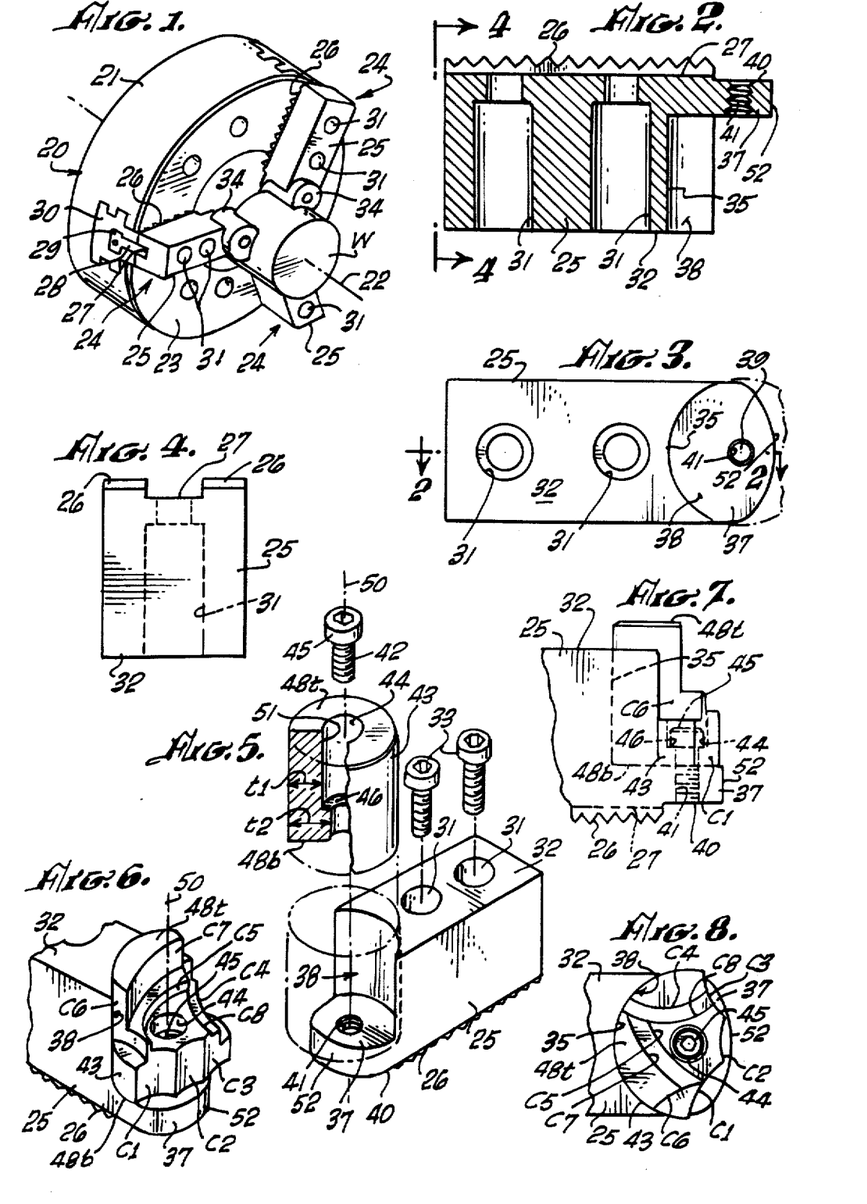
FIG. 1 is a perspective view of one embodiment of the invention.
FIG. 2 is a view taken on line 2—2 of FIG. 3.
FIG. 3 is a plane view of a top jaw in the FIG. 1 embodiment, with slug (in phantom) mounted thereon.
FIG. 4 is an end view of FIG. 3.
FIG. 5 is an exploded perspective view of a top jaw assembly shown in FIG. 1.
FIG. 6 is a perspective view of a rotatable worked slug mounted on a top jaw in the invention.
FIG. 7 is a fragmentary elevational or side view of the assembly shown in FIG. 6.
FIG. 8 is a top plan view of the assembly shown in FIG. 6.

Referring now to the drawing wherein reference characters correspond to like numerals hereinafter, FIG. 1 illustrates the subject matter of the invention mounted on a conventional chuck 20. Chuck 20 comprises a cylindrical body 21 formed about its central or longitudinal axis 22 and includes a chuck face 23 thereon and on which a plurality of equi-distantly disposed and radially-extending top jaw assemblies 24 is mounted. Each jaw assembly 24 comprises a jaw body 25, FIGS. 2–5, along the inner face of which corresponding rows of serrations 26 are formed and separated by a channel 27, FIG. 4. Although not visible in FIG. 1, corresponding serrations are mounted on a master jaw to mate with serrations 26, and it is to be understood that any other conventional means for mounting each jaw body 25 on a chuck face 23 may be utilized to do so. In this instant illustration, channel 27 mounts on a key 28, FIG. 1, formed on a T-member 29 that is part of a conventional master jaw 30 installed within and actuated in known manner in chuck 20, the key 28 projecting outwardly of face 23 to receive channel 27.

Each jaw body 25 includes, FIG. 2, a pair of relief-and-counter-bored openings 31 extending inwardly from its outer face 32 mounted in alignment with channel 27, FIG. 4, for insertion of machine screws 33, FIG. 5, which physically attach or secure jaw body 25 to T-member 29, the latter containing corresponding threaded holes (not shown) for machine screws 33. Actuation of master jaw(s) 30, in known manner, moves each jaw assembly 24 radially inwardly towards or outwardly from axis 22, in operation, after tightening of machine screws 33 to T-member 29, in order that jaw assemblies 24 grip a workpiece W, FIG. 1, on which machining operations are to be performed.

It is to be noted that the thickness of the jaw body 25 is defined as being completely within or between its inner face (on which serrations 36 are illustrated, FIGS. 2–5) and its outer face 32.

A workpiece gripping member, insert or "slug" 34 is securely mounted to each jaw body 25 in the latter's frontal portion. Jaw body 25 includes in its frontal portion a cylindrical wall 35 extending from its outer face 32 to a base member 37 in its frontal portion and which base member 37' projects in a direction towards the chuck's axis 22, and thereby providing a cutout portion 38 in the jaw body in which slug 34 seats. Cylindrical wall 35 is formed about a radius having its point 39, FIG. 3, disposed on the longitudinal axis of jaw body 25. The bottom face 40, FIG. 2, of base member 37 is elevated above or otherwise is in non-alignment with serrations 26 to eliminate interference between base member 37 and chuck face 23 in the radial movement of each jaw assembly 24. A drilled and tapped hole 41 is formed in base member 37 so that a threaded Allen mounting screw 42, FIG. 5, secures slug 34 to base member 37. It may be desirable to mount a steel thread insert (not shown) in threaded hole 41 to provide additional strength to the mounting, when the jaw body is fabricated from aluminum.

Each slug 34 comprises a member having a cylindrical wall 43 terminating the one dimension of a workable or machinable material, and includes a central opening 44 constituting a counterbored-and-relief hole so that a head 45 formed on Allen screw 42 inserted therein seats upon a relief or surface 46, FIGS. 5, 7, formed in opening 44 to secure slug 34 to base member 37, screw 42 preferably not projecting past bottom wall 40. The curvatures of walls 35 and 43 have the same radius for a given jaw body 25 and slug 34, so that wall 35 provides solid support for wall 43 of slug 34 in any of its reset positions in carrying out the practice of the invention.

The slug, insert, or gripping member 34 itself, in further detail, is a relatively soft material so that it can be worked or machined to shape a new or different gripping surface, hereinafter indentified as a contour C1, C2, etc., in a repeated workability of the slug. By "soft" it is meant that the material of slug 34 refers to a metal or other material which is readily workable or machinable, for reshaping, as distinguished from heat treated or hardened metal which is not readily workable or machinable. Examples of such soft material are a plastic such as DELRIN, or aluminum, or any metal not heat treated or hardened. The cylindrical nature of member 34 comprises, FIG. 5, top and bottom walls 48t, 48b joined together by cylindrical wall 43, and central opening 44 extending betwen top and bottom walls 48t, 48b and which is spaced from cylindrical wall 43 by the thickness of the soft materia forming the slug, insert or gripping member 34. Central opening 44 is formed by an endless interior wall 51, FIG. 5, however, because of different thicknesses along its length of the soft material there between and cylindrical wall 43, relief surface 46 (a square-corner type) is formed along the length of the cylindrical member. A lesser magnitude of thickness t1 extends downwardly from top wall 48t to relief surface 46, while a greater magnitude of thickness t2 extends upwardly from bottom wall 48b, relief surface 46 being formed by their differences. The head 45 of Allen screw 42 mounts on relief surface 46 when the screw secures slug 34 to a top jaw member.

A step of processing the slug's saleable or unworked cylindrical nature is first undertaken to produce or fabricate a particular gripping surface C1, C2, etc, at a given time for gripping a particular workpiece. Central opening 44 is formed by conventional drilling and counterboring machine processes, after the bar stock from which the slug is to be fabricated is cut to the desired longitudinal length for a slug. The slug may be sold with or without central opening 44. The step of machining a gripping surface C1, C2, etc., is accomplished usually at the time of knowledge of the configuration of the workpiece W to which such gripping surface 47 mounte, or if desireable, a set of three (3) slugs may be fabricated to a desired size and thus ready for immediate reshapeability should a workpiece demanding such sized set require it.

FIGS. 6, 7, and 8 illustrate a slug 34 that has been worked several times, the reshaping of its material in each working developing a different walled contour because of a different contoured workpiece to be gripped. In the illustrations, there are at least 7 distinct gripping contours C1, C2, C3, C4, C5, C6 and C7 each of which being developed independently of another as a result of (re)working or (re)shaping slug 34 from its immediately previous reworked or non-shaped (salable) condition. For example, contour C7 could have been shaped from the original cylindrical nature, FIG. 5 of slug 34 before the shaping of any other contour, it being noted that contour C7 is formed "behind" the axis 50, FIG. 5, for slug 34 i.e., between axis 50, FIG. 5, and cylindrical wall 35 when contour C7 is in its functioning position for gripping a workpiece, and not between axis 50 and the top jaw's frontal edge 51, FIGS. 6, 8. Development of any contour behind axis 50 must be shaped above (tightened) Allen screw head 45, examples of such contours being C7 and C5 to prevent interference between its gripping surface and Allen screw 42. Contour can be developed below the plane of the top of Allen screw head 45, in "front of" axis 50, examples being C1, C2, C3, and C4. Some contours, such as contours C6, lie above and below the plane of the top of Allen screw head 45. In any of the latter two instances of contour development, Allen screw 42 does not interfere with the corresponding gripping functions of these contours C1, C2, C3, C4 and C6 when any one of these contours is set in its functioning position.

The functioning position for any one of contours C1, C2, etc, is represented by the position of contour C2 as shown in FIG. 8. It is to be noted that for any contour in its functioning position, a sufficient amount of cylindrical wall 43 on its slug is provided to abut or engagingly mount to wall 35 of top jaw 25. Consequently, a direct solid line of support exists for such contour, contour C2 in its functioning position shown in FIGS. 6–8, being an example, from the solid rigid material behind wall 35 through wall 43 and the thickness of the reshaped slug in which the contour, such as contour C2, is disposed in its functioning position. This solid line of support exists for any one of the contours while gripping its particular workpiece. The rotatability of reworked slug 34 provides for such line of support, which is directed substantially along the longitudinal length of top jaw assembly 24, i.e., towards the workpiece and the chuck's axis 22. The rotatability of the reworked slug 34 places the particular contour in proper or reset position to provide the necessary gripping of a workpiece.

To form, by way of illustration, a gripping surface, say, C2, in each set of three slugs, each slug (either in salable mode, i.e., never worked but being of a solid cylindrical nature, or in the context of the slug in FIGS. 6–8 without surface C2) is secured by an Allen screw 42 to base member 37 of its corresponding top jaw 24. The portion of each slug's wall 43, opposing the area where surface C2 is to be machined, cooperatively engages its corresponding (top jaw) wall 35. A "spider" (not shown), a machine shop expedient comprising a hex nut with three screws radially projecting the same distance from its flat walls and being equi-distant from one another, is used. The top jaw assemblies are moved in, their slugs engaging their three screws on the spider. Such engagement occurs between the screws and the slug's eylindrical wall 43, along each slug's length adjacent its bottom 48b, i.e., where thickness t2, FIG. 5, is located. Then a cutting or boring tool mounted on the lathe is introduced to cut such desired contour in the material of and along portions of the lengths of all three slugs and which constitute respective gripping surfaces C2 for all three slugs. In effect, the position of such surfaces C2 substantially correspond to or coincide with the annular wall or periphery, i.e., to the cylindrical nature, of the workpiece that will be gripped by surface C2. The jaw assemblies then are moved radially outwardly, the spider is released and removed, and surfaces C2 are ready to grip their workpiece. This method of developing a gripping surface can be repeated many times, in the same slug or slugs, by unsecuring and rotating the slug or slugs about base 37 to reset positions, and then securing them again, after which a cutting or boring step again is undertaken.

It is to be noted that a contour surface can be incorporated along any length of a slug, as long as the surface being shaped does not interfere with screw 42 or its function. FIG. 6 illustrates this well.

Figures 9, 10, 11, 12, 13, 14:
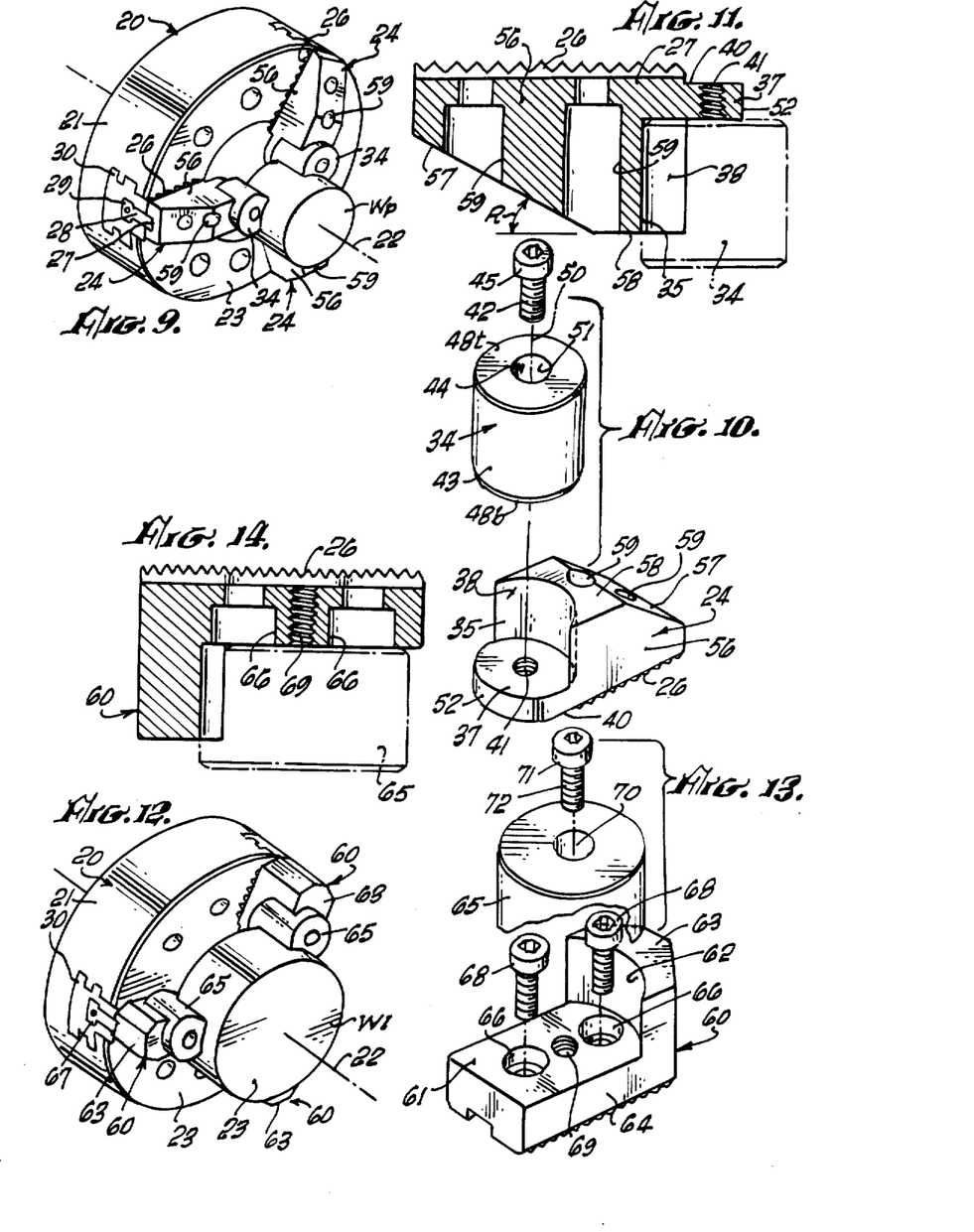
FIG. 9 is a perspective view of another embodiment of the invention.
FIG. 10 is an exploded perspective view of a top jaw assembly illustrated in FIG. 9.
FIG. 11 is a cross-sectional elevational view of the jaw body proper shown in FIG. 9, with a "slug" in phantom mounted thereon.
FIG. 12 is a perspective view of another embodiment of the invention.
FIG. 13 is an exploded perspective view of a top jaw assembly shown in FIG. 12.
FIG. 14 is a cross-sectional elevational view of the jaw body proper shown in FIG. 12, with a "slug" in phantom mounted thereon.

In the embodiment illustrated in FIGS. 9, 10, and 11, each top jaw body 56 includes an inclined surface 57 formed in its outer face 58 to provide a relief angle R behind a slug 34. In the embodiment illustrated, the plane of surface 57 intersects the axis for the opening 59 while such plane also intersects the plane of outer face 58 throughout the latter's loci of geometrical points. In the case of steel top jaws being mounted in a high rpm machine, the reducton in weight by reason of inclined surfaces 57 in top jaw assemblies reduces the centrifugal forces acting on such jaws, with the advantage of an increase in gripping force on workpiece Wp, FIG. 9, resulting. The relief R in many instances of operation is the difference between release and non-release of a held workpiece Wp while being machined. Further, interference is eliminated with stationary lathe elements that otherwise could occur during rotation of chuck and top jaw assemblies.

FIGS. 12, 13 and 14 illustrate another embodiment of the invention. A jaw body 60 includes a cutout portion 61, FIG. 13, substantially throughout its longitudinal dimension (contrary to the fuller jaw bodies and lesser cutout portions of the earlier described embodiments), to form a cylindrical wall 62 extending from an outer face 63 to a base 64 on which a slug 65 entirely mounts on or seats lengthwise in base 64, FIG. 14. A spaced pair of relief-and-counterbored openings 66 are formed in base 64 for attaching jaw body 60 to a T-member 67, FIG. 12. A pair of machine screws 68 inserted into openings 66 securely mount jaw body 60 to T-member 67 in the same manner as described above relative to screws 33 in FIG. 5. A drilled-and-threaded bore 69 is formed in base 64 between such mounting holes 66. Slug 65 mounts on base 64 and includes an aperture 70 therein which includes a surface of relief (not visible) alikened to relief 46 in FIG. 5, so that a head 71 of a threaded Allen screw 72 tightened against such relief secures slug 65 to base 64 while abutting cylindrical wall 62. A workpiece W1, of a larger size than that machined in the earlier described embodiments, mounts to the jaw assemblies, with each slug 65, previously machined along a portion of its length, conforming to the configuration of the outside wall of workpiece W1. Slugs 65 are rotatable and workable in the same manner as described in the earlier embodiments, whereby different gripping contours for different sized larger workpieces can be shaped and reshaped.

Figure 15:
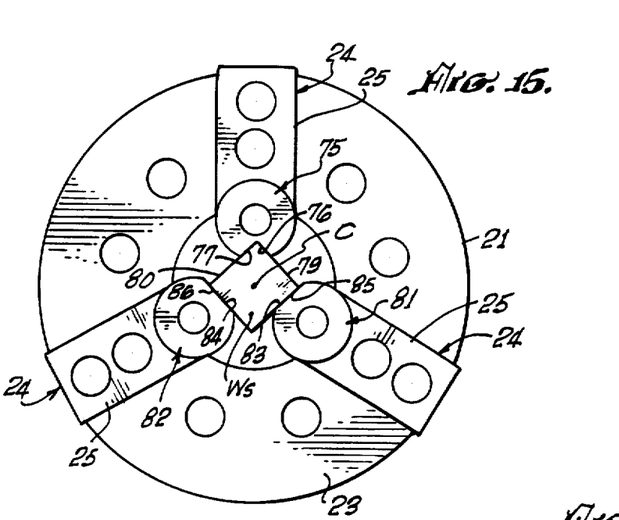
FIG. 15 is a view of still another embodiment of the invention, taken from a position facing a chuck's face.
Figures 16, 17, 18:
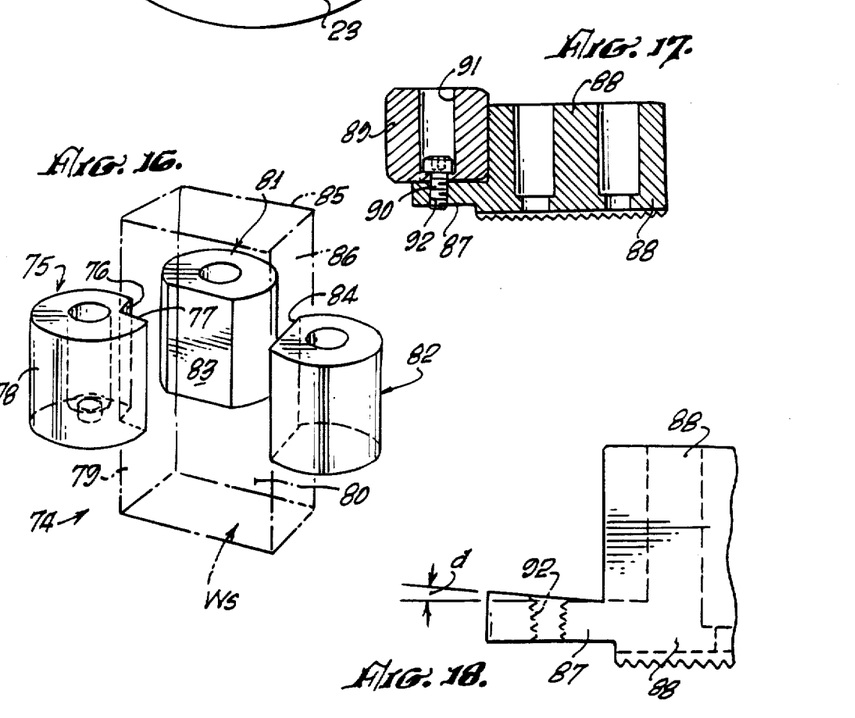
FIG. 16 is a perspective view of a set of rotatable worked slugs utilized in the FIG. 15 embodiment, as applied to a squared workpiece shown in phantom.
FIG. 17 is a cross-sectional view of a top jaw assembly constituting another embodiment of the invention.
FIG. 18 is an enlarged full elevational view of a portion of FIG. 17.

In the embodiment illustrated in FIGS. 15, 16, a square bar Ws is shown as a workpiece, as distinguished from a round bar. There is no need to change from a three-jaw chuck to a four-jaw chuck to grip the four sides of workpiece Ws. A set 74 of three (3) slugs are utilized, they being mounted on top of jaw bodies in accordance with the heretofore descriptions concerning such mountings. Slug 75 in set 74 includes a 90-degree or V-shaped groove formed by two walls 76, 77 directed inwardly from the periphery 78 of slug 75, and which grip two adjacent walls 79, 80, respectively, of workpiece Ws. In the other two slugs 81, 82, flat walls 83, 84, respectively, are machined throughout their lengths, and are adapted to grip the third and fourth walls 85, 86, respectively, or workpiece Ws.

It is to be noted that each set 74 of slugs only can be used on a square workpiece for which such set is designed. For example, for a 2" square workpiece, a sufficiently deep groove in slug 75 provides for adequate support against walls 79, 80. Keeping in mind that jaw assemblies 75, 81, 82 displace at equal rates the same radial distances to and from axis 22 of chuck 20, and that center C of the workpiece is to remain coincident to axis 22, should the square workpiece become ¼" in size, that same deep groove can not be used in order to retain the center C of the ¼" workpiece on axis 22 of chuck 20. I.e., the jaw assembly carrying slug 75 doesn't move in farther towards axis 22 than does the jaw assemblies carrying slugs 81, 82. Besides, the deep groove would tend to swallow up the ¼" or other workpiece smaller than 2" workpiece for which the deep groove was shaped or designed. Consequently, different-sized grooves for different sized workpieces are provided in sets of slugs which are of the same diametrical size.

It should be noted, however, that slugs 75, 81, 82 nevertheless, remain workable and can be reshaped if necessary or desirable, into any of the shaped embodiments described herein or otherwise within the scope and spirit of the invention.

In another embodiment of the invention, FIGS. 17, 18, the base 87 of each jaw member 88 is inclined upwardly as at d, say, as an example, 0.25 degrees. A slug 89 is secured upon base 87 by means of a screw 90 installed in a relief-and-counterbored opening 91 and threaded to the tapped bore 92 therein. Screw 90 is a socket-head capped screw, so that a larger wrench, turning screw 90, provides for a greater torque when tightening down the screw. The effect of this is that when slug 89 is clamped down to base 87, it becomes flat against it, and creats a pressure that forces the diameter of the slug, i.e., its circumference or annular wall, against the matching radius in the cylindrical wall of the jaw. Consequently, a tighter securement between slug and jaw body is achieved for any reset position of a reshaped slug.

In operation of each of the embodiments described, the master jaw is actuated in a conventional manner so as to cause the top jaw assemblies to move in unison radially outwardly. The slugs or gripping members in each embodiment are securely attached to their bases of their corresponding jaw bodies, with their prepared or preformed gripping surfaces conformed to the configuration of the wall of the workpiece. The workpiece is inserted in a location circumscribed by such gripping surfaces and the shaped gripping surfaces of the slugs are caused to grip the workpiece tightly as the master jaw moves the jaw assemblies radially inwardly. Once a satisfactory grip upon the work piece is obtained by such movement, the workpiece then is machined in accordance with the design to be produced thereon.

To re-use the slugs again, i.e., to grip a workpiece of different diameter, each slug of a set is reworked to shape another gripping surface which will correlate to such different diameter. Then, each such slug is fastened to its base member on a top jaw, after it has been rotated into a reset position so that the shaped gripping surface engagingly mounts on such different diameter, with a direct line of supporting force existing between such engaged mounting and the cylindrical wall in the top jaw member. As a practical matter, after each slug's gripping contour grasps the workpiece and rotates slightly against the workpiece so as to exactly conform to the latter, only then is its screw tightly fastened to its base. .

In the assembly of each embodiment of the invention, each jaw assembly is mounted in a conventional manner upon the projection of its corresponding T-member, so that its chuck mounting means, such as serrations, face corresponding mounting means on chuck face 23. The machine screws for mounting each jaw body to its corresponding T-member are inserted into their respective openings for securing the jaw body to its T-member. Each slug is mounted to its jaw body by its corresponding Allen screw being inserted through the central opening of the slug and threaded to the base on the jaw body. This step of assembly of each slug to jaw body may be accomplished before or after each jaw assembly is mounted to its T-member, and before or after the slug has been worked or machined to provide the desired configuration for its gripping surface and which, of course, correlates to the configured wall of the workpiece.

It is to be noted that the invention comprehends the utilization of a set 74 of slugs which does not incorporate the V-groove of slug 75, but rather that a slug having a flat face, like those on slugs 81, 82, be substituted for slug 75. In this manner then, hex-shaped workpieces are gripped by the flat faces of the slugs.

Each slug and each jaw body are fabricated in known manner and by conventional processes and techniques in the art. Either fabricated from steel or aluminum, while the slug also can be fabricated from DELRIN plastic. Various changes and modifications may be made without varying from the spirit and scope of the appended claims.

INDUSTRIAL APPLICABILITY

The invention is applicable, though not necessarily limited to, machine and machine tool arts.

We claim:

1. In any one of a plurality of top jaw assemblies radially mounted on a chuck having an axis and including a top jaw body having an inner face and an outer face defining only a complete thickness between said inner face and outer face,
    a first means through such complete thickness by which said body is securable to a master jaw or the like,
    the improvement comprising
    a base member of lesser thickness than and mounted to and within said complete thickness extending in a direction towards the chuck's axis,
    a cylindrical wall in such complete thickness extending from said outer face towards said base member to form a cutout portion with said base member,
    a rotatable workable member cylindrical in nature, adaptable by working it to the configuration of a workpiece which it is to grip, mounted on said base member and directly abutting said cylindrical wall, and
    a second means comprising a threaded aperture in said base member, an opening in said rotatable member, and a screw mounted in said opening and threadable into said threaded aperture, for securing said rotatable member in such cutout portion.

2. In the improvement of claim 1, a relief surface formed in said outer face across said first securing means to thereby lessen the weight of the top jaw assembly, resulting in a reduced centrifugal force that provides a tighter workpiece grip in operation of the invention.

3. The improvement of claim 1 or claim 2 in combination with a chuck, each of said top jaw assemblies radially mounted to said chuck.

4. In the improvement of claim 1 or claim 2,
    said rotatable member being workable to produce a reworked surface for gripping a different workpiece and rotatable about said base member so as to provide gripping of such different workpiece by such reworked surface.

5. In the improvement of claim 1 or claim 2, said base member being inclined upwardly so that upon torqueing its corresponding rotatable gripping member by said second securing means a tighter relationship between said body and workable gripping member develops.

6. The improvement of claim 5 in combination with a chuck, each of said top jaw assemblies radially mounted to said chuck.

7. In the improvement of claim 5,
    said rotatable member being workable to produce a reworked surface for gripping a different workpiece and rotatable about said base member so as to provide gripping of such different workpiece by such reworked surface.

8. A top jaw assembly adapted for use on a chuck comprising
    a jaw body having an inner face and an outer face defining only a complete thickness between said inner face and outer face,
    a first means through such complete thickness by which said body is securable to a master jaw or the like,
    a base member of lesser thickness than and mounted to and within said complete thickness extending in a direction towards the chuck's axis,
    a cylindrical wall in such complete thickness extending from said outer face towards said base member to form a cutout portion with said base member,
    a rotatable workable member cylindrical in nature, adaptable by working it to the configuration of a workpiece which it is to grip, mounted on said base member and directly abutting said cylindrical wall, and
    a second means comprising a threaded aperture in said base member, an opening in said rotatable member, and a screw mounted in said opening and threadable into said threaded aperture, for securing said rotatable member in such cutout portion.

9. The top jaw of claim 8 wherein said base member is inclined upwardly so that upon torqueing the rotatable gripping member by said second means a tighter relationship between said body and rotatable gripping member is established.

10. The top jaw assembly of claim 8 or claim 9 in combination with a chuck, each of said top jaw members radially mounted to said chuck.

11. The top jaw assembly of claim 8 or claim 9 wherein
    a relief surface is formed in said outer face across said first securing means to thereby lessen the weight of the top jaw assembly, resulting in a reduced centrifugal force that provides a tighter workpiece grip in operation of the invention.

12. The top jaw assembly of claim 11 in combination with a chuck, each of said top jaw members radially mounted to said chuck.

13. The top jaw of claim 8 or claim 9 wherein
    said rotatable gripping member is workable to produce a reworked surface for gripping a different workpiece and rotatable about said base member so as to provide gripping of such different workpiece by such reworked surface.

14. The top jaw assembly of claim 13 in combination with a chuck, each of said top jaw members radially mounted to said chuck.

15. A manufacture comprising
    a set of workable rotatable workpiece gripping members each having cylindrical wall and an opening adapted for attaching it to a corresponding top jaw member,
    said gripping members comprising
        (a) a first cylindrical member having a 90-degree groove formed inwardly thereof from its cylindrical wall but not to its opening for gripping two sides of a square workpiece to be turned by a chuck, and (b) second and third cylindrical members each of which including a longitudinally-extending flat face the plane of which being disposed between its geometrical cylindrical wall and its opening for gripping respective remaining sides of the square workpiece, and corresponding top jaw members for said gripping members, each of said top jaw members comprising (a) a jaw body having an inner face and an outer face defining only a complete thickness between said inner face and outer face.

(b) a first means through such thickness by which said body is securable to a master jaw or the like, (c) a base member of lesser thickness than and mounted to and within said complete thickness extending in a direction towards the chuck's axis, (d) a cylindrical wall in such complete thickness extending from said outer face towards said base member to form a cutout portion with said base member for mounting one of said gripping members, and a second means comprising a threaded aperture in said base member, a screw mountable in said opening and threadable into said threaded aperture for securing a corresponding one of said rotatable gripping members in such cutout portion.

16. The combination set out in claim 15 in combination with a chuck, each of said top jaw members radially mounted to said chuck.

17. The manufacture of claim 15 or claim 16 wherein one or more of said rotatable gripping members is workable to produce a reworked surface for gripping a different workpiece and rotatable about said base member so as to provide gripping of such different workpiece by such reworked surface.

18. The combination of claim 15 or claim 16 wherein said base member is inclined upwardly so that upon torqueing its corresponding gripping member by said means mounted in said opening a tighter relationship between said body and gripping member develops.

19. The manufacture of claim 18 wherein one or more of said rotatable gripping members is workable to produce a reworked surface for gripping a different workpiece and rotatable about said base member so as to provide gripping of each different workpiece by such reworked surface.

* * * * *

UNITED STATES PATENT AND TRADEMARK OFFICE
CERTIFICATE OF CORRECTION

PATENT NO. : 4,706,973

DATED : November 17, 1987

INVENTOR(S) : Covarrubias et al

It is certified that error appears in the above-identified patent and that said Letters Patent is hereby corrected as shown below:

at column 10, line 63, --a-- should be read after "having".

at column 11, line 15, the period (.) should be read as a comma --,--.

at column 12, line 24, "each" should be read as --such--.

Signed and Sealed this

Fifth Day of July, 1988

*Attest:*

DONALD J. QUIGG

*Attesting Officer*   *Commissioner of Patents and Trademarks*